United States Patent [19]

Yamanaka et al.

[11] Patent Number: 5,005,165
[45] Date of Patent: Apr. 2, 1991

[54] METHOD FOR MANAGING INFORMATION ON A STORAGE MEDIA WITHOUT LOSING INFORMATION DUE TO EFFECTS

[75] Inventors: Toshihiro Yamanaka; Shigemi Maeda; Nobuyuki Horie, all of Nara, Japan

[73] Assignee: Sharp Kabushiki Kaisha, Osaka, Japan

[21] Appl. No.: 284,328

[22] Filed: Dec. 14, 1988

[30] Foreign Application Priority Data

Dec. 15, 1987 [JP] Japan ................. 62-316862

[51] Int. Cl.$^5$ ............................. G11B 7/00
[52] U.S. Cl. ...................... 369/58; 371/21.6
[58] Field of Search .............. 360/48, 31, 114, 47, 360/31; 358/342; 369/13, 53–58; 371/10.1, 10.2, 10.3, 21.1, 21.6

[56] References Cited

U.S. PATENT DOCUMENTS 4,498,146 2/1985 Martinez ................. 369/58 X
4,631,723 12/1986 Rathbun et al. ............ 360/47 X
4,835,757 5/1989 Abiko .

FOREIGN PATENT DOCUMENTS 59-94243 11/1982 Japan .
59-165207 3/1983 Japan .
0272029 6/1988 European Pat. Off. .
0271335 6/1988 European Pat. Off. .
3728857 8/1985 Japan .

OTHER PUBLICATIONS

Article: Interface; published in May, 1984; Hirotaka Oshima.
IBM Technical Disclosure Bulletin, vol. 27, No. 10A, Mar. 1985; "Method for Tracking Embedded Defective Disk or Diskette Sectors", p. 5604.
IBM Technical Disclosure Bulletin, vol. 29, No. 5, Nov. 1986; "Method to Manage Sector Defects", pp. 2607–2608.
IBM Technical Disclosure Bulletin, vol. 26, No. 10B, Mar. 1984; "Soft-Sectored Hard File Defective Sector Mapping", pp. 5769 to 5770.
The English Abstract of Japanese Patent No. 60-74158 dated Apr. 26, 1985.
The English Abstract of Japanese Patent No. 61-32266 dated Feb. 14, 1986.

Primary Examiner—Robert L. Richardson

[57] ABSTRACT

A magneto-optic storage media is provided with two defect information blocks for storing information concerning a defect. At the time of reproduction, both the blocks are read, and it is determined whether or not the reading operation is normal. If the reading operations of both the blocks are normal, it is determined which of the respective numbers of registrations of the information concerning a defect stored in both the blocks is larger so that the block in which the number of registrations is larger is utilized. Then, the defect information in the block which was not employed is updated and registered with the defect information. if the defect information is not registered, the block is switch so that an updating and registering operation can be executed again.

7 Claims, 4 Drawing Sheets

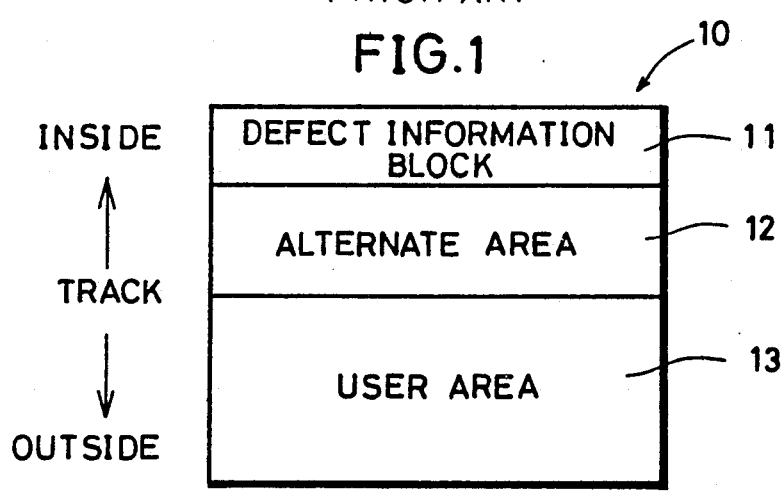
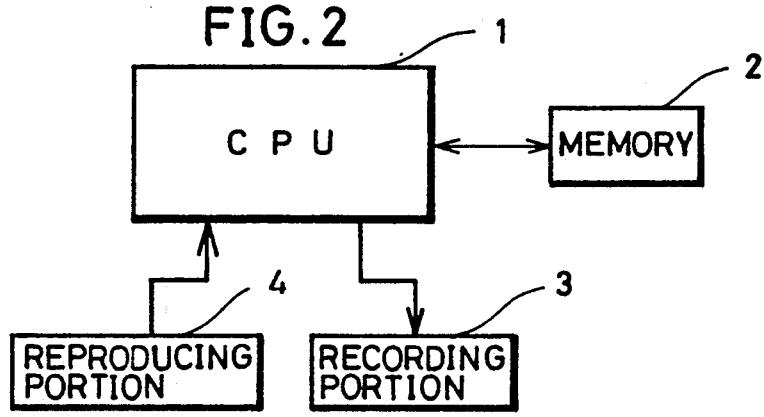
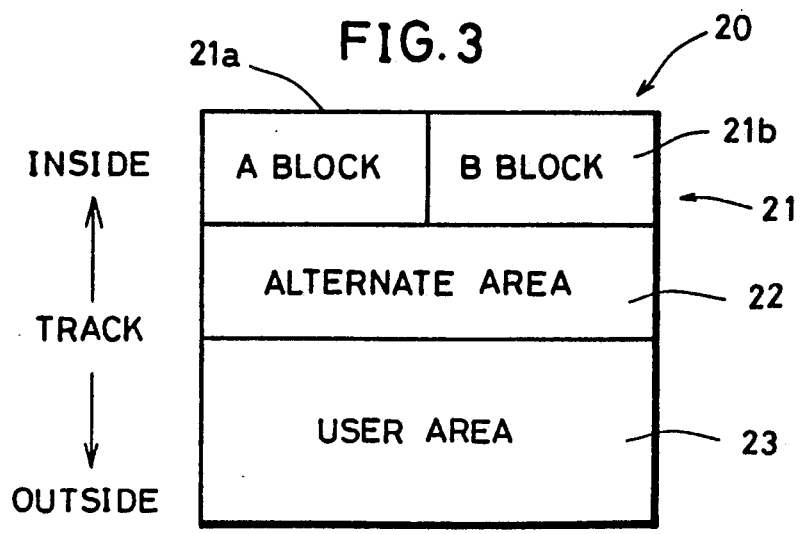

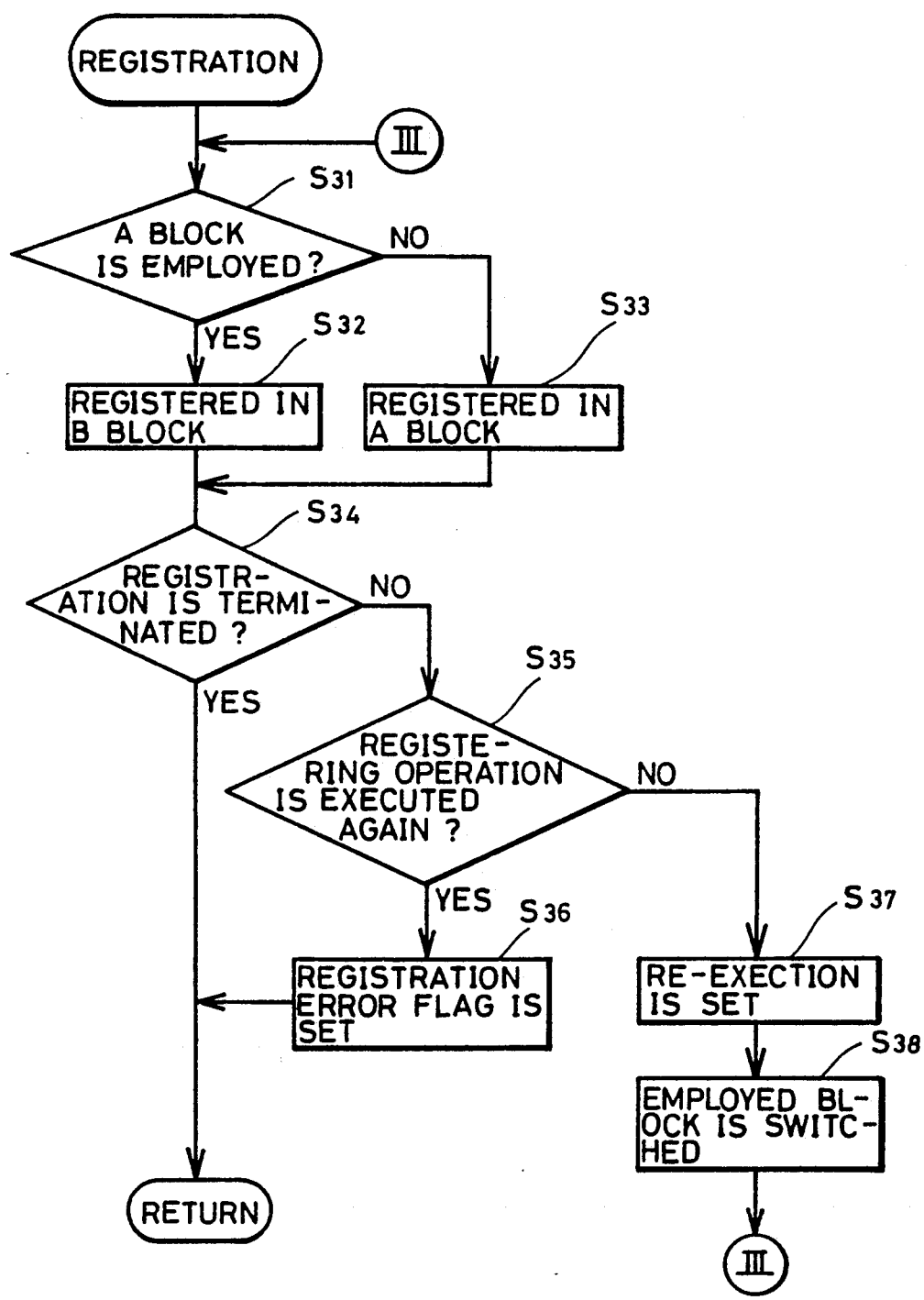

METHOD FOR MANAGING INFORMATION ON A STORAGE MEDIA WITHOUT LOSING INFORMATION DUE TO EFFECTS

BACKGROUND OF THE INVENTION

1. Field of the Invention

The present invention relates generally to a defect information managing method, and more particularly, to a defect information managing method for protecting and managing information when a defect exists on a storage media.

2. Description of the Background Art

FIG. 1 is an illustration showing a track structure for a storage media of the storage device which is a background of the present invention. In FIG. 1, a storage media 10 is provided with a defect information block 11, an alternate area 12, and a user area 13 in that order, for example, from an inside track to an outside track. Information concerning a defect on a storage media is stored in each track of the defect information block 11. The information concerning a defect includes, for example, information indicating which track is defective. A defective portion of the user area 13 is replaced with the alternate area 12, in which information in the defective portion is stored. In the storage device 10, the defective portion of the track in the user area 13 is replaced with the alternate area 12 based on the information stored in the defect information block 11, so that the reliability is improved.

Meanwhile, if and when digital information is written onto a magnetic disk such as a hard disk or a floppy disk, the information is stored by completely inverting the magnetization corresponding to binary information, so that new information can be overwritten on old information without erasing the old information. However, in the case of a magneto-optic disk, the old information must be erased once before writing. Therefore, in the magneto-optic disk, if an accident such as instantaneous power failure occurs when the information concerning a defect in the above described defect information block 11 is updated, the defect information on the disk is destroyed. Thus, in the worst case, the entire system can not be utilized. In addition, if the information concerning a defect has been erased, it is liable to be erroneously recognized that no information concerning a defect is registered.

SUMMARY OF THE INVENTION

An object of the present invention is to protect information concerning a defect which exists on a storage media if an accident occurs when the information is updated and registered again.

Briefly stated, according to the present invention, first and second defect information storage areas in which information concerning a defect on a storage media can be stored are provided on the storage media, either one of the first and second areas on the storage media being updated, when the information concerning a defect is updated by updating means.

In accordance with another aspect of the present invention, the area to be updated is an area other than an area in which the newest information is stored.

In accordance with still another aspect of the present invention, the area to be updated is an area in which the number of registrations of information concerning a defect is smaller.

According to the present invention, either one of the first and second defect information storage areas on the storage media is updated. Thus, even if an accident occurs during updating, the information concerning a defect always remains in either one of the defect information storage areas, never to disappear.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration showing a track structure for a storage media of a storage device which is the background of the present invention;

FIG. 2 is a schematic block diagram showing an electrical structure of a magneto-optical type storage device according to one embodiment of the present invention;

FIG. 3 is an illustration showing a track structure for a magneto-optic storage media according to one embodiment of the present invention; and FIGS. 4A to 4C are flowcharts for explaining an operation according to one embodiment of the present invention.

DESCRIPTION OF THE PREFERRED EMBODIMENTS

Figure 4A:
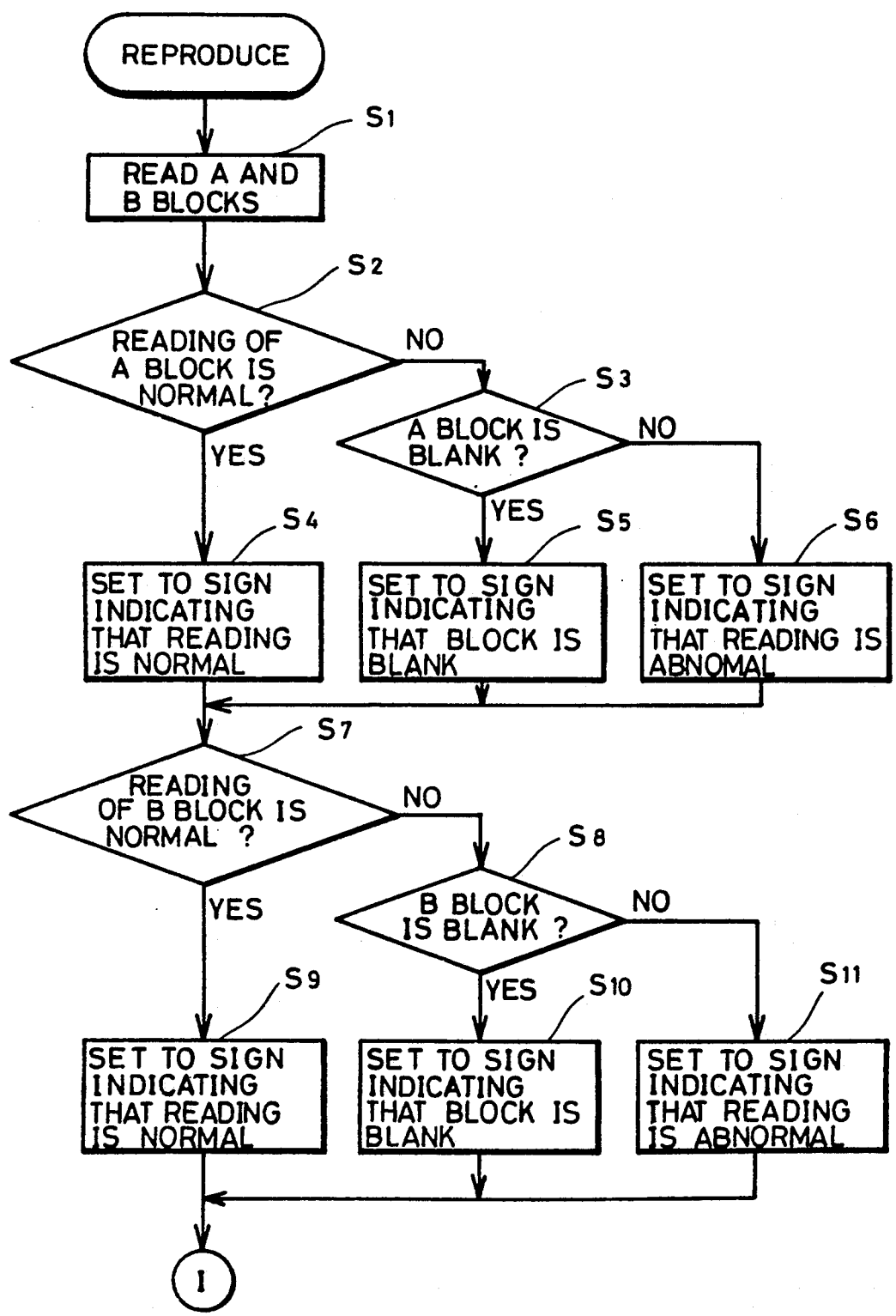

FIG. 2 is a schematic block diagram showing an electrical structure of a magneto-optical type storage device according to one embodiment of the present invention. In FIG. 2, a memory 2, a recording portion 3 and a reproducing portion 4 are connected to a CPU (Central Processing Unit) 1. The memory 2 comprises a ROM (Read-Only Memory) for storing an operation program of the CPU 1 based on flowcharts of FIGS. 4A to 4C as described below and a RAM (Random Access Memory) for providing a work area. The recording portion 3 is used for writing information onto a magneto-optic disk, and the reproducing portion 4 is used for reading the information recorded on the magneto-optic disk.

FIG. 3 is an illustration showing a track structure of a magneto-optic storage media according to one embodiment of the present invention. In FIG. 3, a magneto-optic storage media 20 is provided with a defect information block 21, an alternate area 22, a user area 23 and the like in the order, for example, from an inside track to an outside track. The alternate area 22 and the user area 23 are the same as those shown in FIG. 1 and hence, the description thereof is omitted. The defect information block 21 is divided into a A block 21a and a B block 21b. Information concerning a defect comprises, for example, the track number of a defective track in the user area 23 and the number of registrations (or the number of times of registration) of the information concerning a defect. When the defect information block 21 is updated or registered again, the A block 21a and the B block 21b are alternately reloaded so that information always remains in one of the blocks even if information in the other block is erased before writing. Therefore, even if an accident such as instantaneous power failure occurs during updating, information before the accident remains. Thus, if and when the system is automatically returned or returned by, for example, turning on again the power supply, the worst situation can be prevented in which the system is down by an impossibility to reproduce defect information and a malfunction is caused by erroneous recognition of the defect information.

Figure 4B:
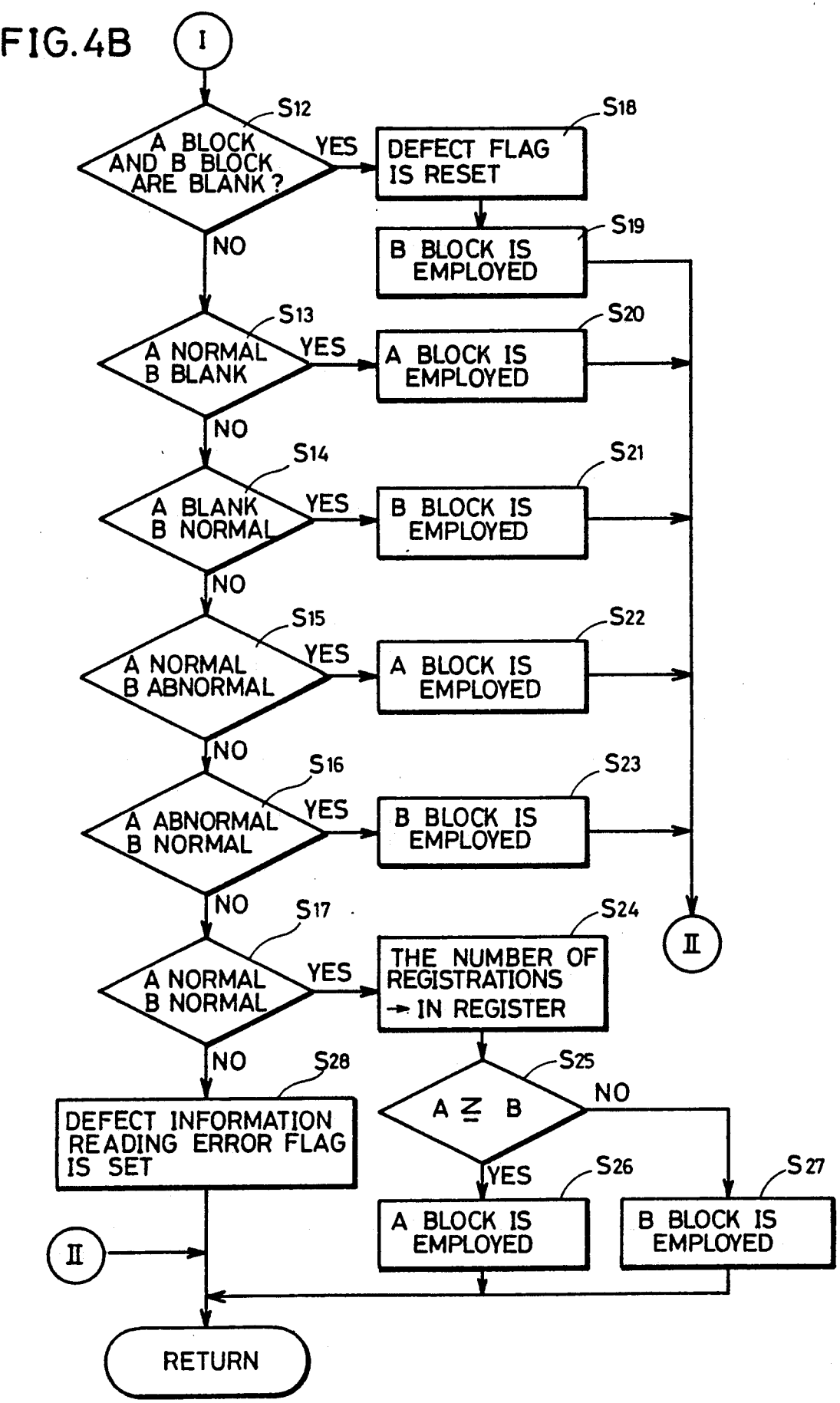

FIGS. 4A to 4C are flowcharts for explaining an operation according to one embodiment of the present invention, where FIGS. 4A and 4B show a reproducing operation and FIG. 4C shows a registering operation. Description is now made on the reproducing operation.

At step S1 (referred to as S1 in the figure), the A block 21a and the B block 21b located in the defect information block 21 of the storage media 20 are read. Subsequently, at step S2, it is determined whether or not reading the A block 21a is normal. If the reading is not normal, it is then determined at step S3 whether or not the A block 21a is blank. If the reading of the A block 21a is normal, a A block reading flag is set to a sign indicating that reading is normal, at step S4. If the A block 21a is blank, the flag is set to a sign indicating that the block is blank, at step S5. On the other hand, if the reading is abnormal, the flag is set to a sign indicating that the reading is abnormal, at step S6. Subsequently, at step S7, it is determined whether or not reading of the B block 21b is normal. If the reading is not normal, it is then determined at step S8 whether or not the B block 21b is blank. If the reading of the B block 21b is normal, a B block reading flag is set to a sign indicating that reading is normal, at step S9. If the B block 21b is blank, the flag is set to a sign indicating that the block is blank, at step S10. On the other hand, if the reading is abnormal, the flag is set to a sign indicating that reading is abnormal, at step S11.

Then, at steps S12 to S17, a block to be used when defect information is registered, i.e., a block holding the stored content is determined based on the above described A block reading flag and B block reading flag. If both the A block 21a and the B block 21b are blank, defect information does not exist. Thus, at step S18, a defect flag is reset. Subsequently, at the step S19, the B block 21b is employed. Certainly, the A block 21a may be employed. If the reading of the A block 21a is normal and the B block 21b is blank, the A block 21a is employed, in the step S20: If the A block 21a is blank and the reading of the B block 21b is normal, the B block 21b is employed, at step S21. If the reading of the A block 21a is normal and the reading of the B block 21b is abnormal, the A block 21a is employed, at step S22. If the reading of the A block 21a is abnormal and the reading of the B block 21b is normal, the B block 21b is employed, at step S23. If the reading of both the A block 21a and the B block 21b are normal, the number of registrations of the information concerning a defect stored a each block is stored in a register in step S24, and the respective numbers of registrations are compared with each other at step S25. If the number of registrations in the A block 21a is equal the number of registrations in the B block 21b or more, the A block 21a is employed at step S26; otherwise the B block 21b would be employed at step S27. In cases other than the above described cases, a defect information reading error flag indicating that the reading of information concerning a defect is abnormal is set at step S28.

A registering operation of the defect information block will now be described. When information concerning a defect must be updated and registered again, the block other than the block employed in the above described reproducing operation is updated and registered. First, at step S31, it is determined whether or not the A block 21a is employed. If the A block 21a is employed, the new number of registrations is added to the number of registrations of the information concerning a defect stored in the A block 21a, to be registered in the B block 21b, at step S32. On the other hand, if the B block 21b is employed, the new number of registrations is added to the number of registrations of the information concerning a defect stored in the B block 21b, to be registered in the A block 21a, at step S33. Subsequently, at step S34, it is determined whether or not registration is normally terminated. If the registration is normally terminated, the operation is terminated. On the other hand, if the registration is not normally terminated, it is determined at step S35 whether or not the registering operation can be executed again. At this time point of determination, if one of the blocks has not been reloaded yet, the block is reloaded. More specifically, re-execution of the registering operation is set at step S37, and the employed block is switched so that the block is reloaded at step S38. Considering a case in which both the blocks are reloaded, if both the blocks are in error, a registration error flag is set at step S36 so that the operation is terminated.

Meanwhile, in the above described registering operation, if both the A block 21a and the B block 21b are blank at the time of reproduction and no defect information exists, a defect flag is reset. Thus, the registering operation is not performed.

In the above described manner, if and when the defect information block 21 shown in FIG. 3 is registered again or updated and registered, both the blocks are read and either one of the blocks is updated and registered and then, the block is switched so that the remaining block is reloaded. Thus, even if the content of the block to be registered is erased during registration, the content of the other block remains, so that the stored content is held.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for managing defect information comprising the steps of:
   (a) providing a first and second defect information storage area in a storage medium;
   (b) determining if a defect is present in the storage medium;
   (c) storing location data of the determined defect in a work area;
   (d) determining which defect information storage area has a greater number of registrations stored therein, a registration representing a location data of a single defect in the storage medium;
   (e) transferring, for storing purposes, registrations from the defect information storage area having the greater number of registrations to the defect information storage area having a lesser number of registrations; and
   (f) transferring, for storing purposes, the location data of determined defect from the work area to the defect information storage area receiving the registrations in said step (e), the location data becoming a new registration.

2. The method as claimed in claim 1, further comprising the steps of:

(g) determining if a number of registrations in the first defect information storage area is equal to a number of registrations in the second defect information storage area; and (h) storing the location data of the determined defect in the first defect information storage if said step (g) makes an affirmative determination.

3. The method as claimed in claim 1, further comprising the steps of:

(g) determining if a number of registrations in the first defect information storage area is equal to a number of registrations in the second defect information storage area; and (h) storing the location data of the determined defect in the second defect information storage if said step (g) makes an affirmative determination.

4. The method as claimed in claim 1, further comprising the step of:

(g) repeating said steps (c), (d), (e), and (f) for every defect determined in said step (b).

5. A defect information managing system for a central processing unit, comprising:

storage means for storing data information to be utilized by the central processing unit;

said storage means including,
a first defect information storage area for storing defect information corresponding to said storage means,
a second defect information storage area for storing defect information corresponding to said storage means, and
a work area for storing data information;

defect detecting means, operatively connected to said storage means, for detecting a defect in said storage means and producing location data corresponding to the defect when detected;

said work area storing said location data produced by said defect detecting means;

comparing means, operatively connected to said storage means, for determining which defect information storage area has a greater number of registrations stored therein in response to said defect detecting means finding a defect, a registration representing location data corresponding to a single defect in said storage means; and transfer means, in response to said comparing means, for transferring registrations from the defect information storage area having the greater number of registrations to the defect information storage area having a lesser number of registrations to be stored therein;

said transfer means transferring said location data from said work area to the defect information storage area receiving the transferring registrations, after the transfer occurs, to be stored therein, said location data becoming a new registration.

6. The defect information managing system as claimed in claim 5, wherein said comparing means also determines if a number of registrations in said first defect information storage area is equal to a number of registrations in said second defect information storage area; and said transfer means transferring said location data from said work area to said first defect information storage area to be stored therein when said comparing means determines the number of registrations in said first and second defect information storage areas are equal.

7. The defect information managing system as claimed in claim 5, wherein said comparing means also determines if a number of registrations in said first defect information storage area is equal to a number of registrations in said second defect information storage area; and said transfer means transferring said location data from said work area to said second defect information storage area to be stored therein when said comparing means determines the number of registrations in said first and second defect information storage areas are equal.

* * * * *